United States Patent [19]
Krotseng

[11] Patent Number: 5,549,858
[45] Date of Patent: Aug. 27, 1996

[54] SILICONE FOAM SYMMETRICAL INVERSION MOLDING PROCESS

[75] Inventor: Kathryn G. Krotseng, Richmond, Va.

[73] Assignee: Manni-Kit, Inc., Richmond, Va.

[21] Appl. No.: 386,108

[22] Filed: Feb. 8, 1995

[51] Int. Cl.⁶ .................................................. B29C 67/20
[52] U.S. Cl. .................... 264/46.4; 264/139; 264/259; 264/321; 264/338; 83/19
[58] Field of Search .................................. 264/321, 139, 264/48, 338, 259, 45.1, 46.4; 83/19

[56] References Cited

U.S. PATENT DOCUMENTS

| | | |
|---|---|---|
| 2,606,398 | 8/1952 | Miller . |
| 3,432,581 | 3/1969 | Rosen . |
| 3,456,046 | 7/1969 | Rosen . |
| 3,541,192 | 11/1970 | Shapero et al. . |
| 3,665,792 | 5/1972 | Bush et al. .................... 83/19 |
| 3,865,284 | 2/1975 | Kazama et al. . |
| 3,872,194 | 3/1975 | Lowry et al. ................ 264/284 |
| 4,036,673 | 7/1977 | Murphy et al. .............. 264/321 |
| 4,265,851 | 5/1981 | Roth ............................ 264/321 |
| 4,418,157 | 11/1983 | Modic . |
| 4,492,775 | 1/1985 | Koshii et al. . |
| 4,559,369 | 12/1985 | Bauman et al. . |
| 4,572,917 | 2/1986 | Graiver et al. . |
| 4,590,222 | 5/1986 | Bauman . |
| 4,656,906 | 4/1987 | Mozieka et al. ............ 264/321 |
| 4,704,408 | 11/1987 | Krug et al. . |
| 4,760,098 | 7/1988 | Miutel . |
| 4,767,794 | 8/1988 | Modic et al. . |
| 4,793,530 | 12/1988 | Krotseng . |
| 4,808,634 | 2/1989 | Uriate et al. . |
| 4,810,728 | 3/1989 | Gross et al. . |
| 4,840,974 | 6/1989 | Gross et al. . |
| 4,877,814 | 10/1989 | Ito . |
| 4,879,317 | 11/1989 | Smith et al. . |
| 4,889,744 | 12/1989 | Quaid . |
| 4,983,641 | 1/1991 | Gross et al. . |
| 4,983,642 | 1/1991 | Nakano et al. . |
| 4,987,155 | 1/1991 | Inoue et al. . |
| 5,011,865 | 4/1991 | Johnson . |
| 5,017,624 | 5/1991 | Johnson . |
| 5,019,295 | 5/1991 | Yoshida et al. . |
| 5,041,466 | 8/1991 | Takahashi et al. . |
| 5,066,259 | 11/1991 | Acker . |
| 5,098,782 | 3/1992 | Hovis et al. . |
| 5,106,548 | 4/1992 | Matsuura et al. ............ 264/321 |
| 5,153,231 | 10/1992 | Bouquet et al. . |
| 5,194,311 | 3/1993 | Baynak et al. . |
| 5,271,736 | 12/1993 | Picha . |

OTHER PUBLICATIONS

General Electric Silicone Product Data (Nov. 1985).
Optimization of Low Density Silicone Foam Process–Structure–Property Relationships (Jun. 1994).

*Primary Examiner*—Allan R. Kuhns
*Attorney, Agent, or Firm*—J. Michael Martinez de Andino; McGuire, Woods, Battle & Boothe, L.L.P.

[57] ABSTRACT

A method for molding silicone foam into an article having the features of a designated object. The method includes the steps of introducing a silicone foam mixture into a first mold having a first cavity, wherein the silicone foam mixture forms a first molded object that has a shape which is representative of the first cavity; removing the first molded object from the first mold; pressing the first molded object into a second mold that has a second cavity, which has a basic profile that is representative of the article, the first molded object forming a layer of foam on the top edge of the second mold; cutting the layer to form an opened celled surface on the top surface of the first molded object; and releasing and removing the first molded object from the second cavity. The opened celled surface acquires the configuration that is representative of the second cavity, while the first bottom surface returns to the shape of the first cavity. A detailed layer having the specific attributes of the article can be applied to the first molded object through the use of a third mold.

19 Claims, 7 Drawing Sheets

SILICONE FOAM SYMMETRICAL INVERSION MOLDING PROCESS

BACKGROUND OF THE INVENTION

1. Field of the Invention

This invention relates to processing silicone foam, and in particular, to a process for forming silicone foam into designated shapes of, but not limited to, low-density silicone foam.

2. Background Information

Conventional methods employed to mold silicone foam into large shapes encounter several problems. One such problem is the inability to form ("blow") silicone foam into large, thick shapes, while maintaining a uniform cell structure throughout the shape. Previous processes for molding shapes of various sizes and thickness included the use of "closed" molds. Closed molds require a porthole or vent system to allow the gases inside the mold to escape the mold. The gases were normally released as the material inside the closed mold cooled and set.

Prior applications that used a closed mold with silicone foam resulted in formed silicone foam shapes that would have air bubbles and disfigurations at the venting area, because the silicone foam as it cooled would attempt to expand through the venting area. Further, the layer adjacent to the inside of the closed mold had a high density due to the expanding layer being compressed against a non-expandable area, the closed mold. Prior applications would be limited in not being able to provide shaped articles having a low density, uniform cell structures of silicone foam.

A uniform cell structure is particularly important in non-skinned silicone foam molded pieces, because a uniform structure size provides uniform compressibility. Prior applications have also been unable to provide silicone foam shapes that simultaneously maintain a low density and have a good "skin" (outer surface). Either the outer skin of the formed silicone foam shape was fine and smooth without air bubbles, but easily torn and had an inner foam that was extremely dense, or the inner foam was low in density and the outer skin was pocked with air bubbles. For these reasons, to date, silicone foams have not been used to make large molded pieces.

For example, prior applications and methods have been unable to produce silicone foam shapes that could readily be used as chairs, seat cushions, or mannequins. Further, in closed environments, such as stores, shopping malls, airline cabins, or museums, it is desirable to use silicone foam instead of plastics because if a fire occurred, the gases produced by the combustion of presently available plastics or cushions can present a deadly hazard. For example, when ignited, polyurethane releases cyanide gas. Not only are these gases toxic, they are often corrosive. This corrosive characteristic can compromise the integrity of electronic systems in an enclosed environment. In non-enclosed and heavily populated environments the burning of cushions still presents a dangerous and damaging situation.

It has been discovered in accordance with the invention described below that a low density, lightweight, buoyant, fire-resistant, non-toxic, non-acidic and non-corrosive alternative to plastics or polyurethane is presently available through the molding of silicone foam. By molding silicone foam through a process disclosed below that includes an application method using an open air mold and a serpentine pouring or spraying application technique for applying a silicone foam mixture, and the use of a forced symmetrical inversion molding process, silicone foam can be formed to produce designated articles of various shapes and sizes. Also, by using the disclosed silicone foam molding process that includes a skinning operation, which includes the spraying or applying of pre-determined amounts of a silicone foam mixture into a detailed mold to produce an outer layer, and a bonding method, which includes the sealing and adhering of the outer layer to an inversion molded cut block of silicone foam to create a skinned molded piece, silicone foam can be formed to produce designated articles of various shapes and sizes having a low density, uniform cell structure with a smooth outer skin.

SUMMARY OF THE PRESENT INVENTION

Accordingly, it is the primary object of the present invention to provide a silicone foam molding process for making silicone foam articles having low density, a uniform cell structure, and being fire-resistant and buoyant.

It is another object of the invention to provide a silicone foam molding process for making silicone foam articles having low density, a uniform cell structure, and being fire-resistant and buoyant, wherein the process includes an application method into an open air mold and a serpentine pouring or spraying application technique for applying a silicone foam mixture, a forced symmetrical inversion molding process, a skinning operation, a bonding method, and a construction process.

It is another object of the invention to provide a silicone foam molding process for making silicone foam articles having low density, a uniform cell size, and being fire-resistant and buoyant, wherein the process includes an application method into an open air mold and a serpentine pouring or spraying application technique for applying a silicone foam mixture; the use of a forced symmetrical inversion molding process, which includes the use of an inverted mold, a pressing device; and a cutting device, a skinning operation, which includes the spraying or applying of pre-determined amounts of the silicone foam mixture into a detailed mold to produce an outer layer; a bonding method, which includes the sealing and adhering of the outer layer to an inversion molded cut block of silicone foam to create a skinned molded piece; and a construction process, which includes the connecting and fastening of several above-identified molded pieces to produce a designated shape.

Another object of the invention is to provide a silicone foam molding process for making silicone foam articles of various shapes and sizes, wherein the process includes the making of an inverted shape of silicone foam by pressing a block or slab of the silicone foam made in an open air mold, pressing the block or slab into a shaped mold, and running a sharp blade or other cutting device between the mold and the applied pressure, such as the presser plate, which when the presser plate is removed an inverted shape of the silicone foam is then released.

A further object of the invention is to provide a silicone foam molding process for making silicone foam articles of various shapes and sizes, wherein the process includes the making of a complex shape of silicone foam, which includes coating an inverted detail mold with a silicone foam mixture to form a skin layer that will reflect whatever surface has been created on the inside of the inverted mold and bonding the skin layer to a pre-cut inverted shape of silicone foam, to form a designated shape or a component of a complex shape, which when attached together with two or more pieces forms a more complex shape.

3

Other objects and advantages of this invention will become apparent from the following description taken in connection with the accompanying drawings wherein are set forth, by way of illustration and example, certain embodiments of this invention.

DETAILED DESCRIPTION OF THE PREFERRED EMBODIMENTS

Figure 1:
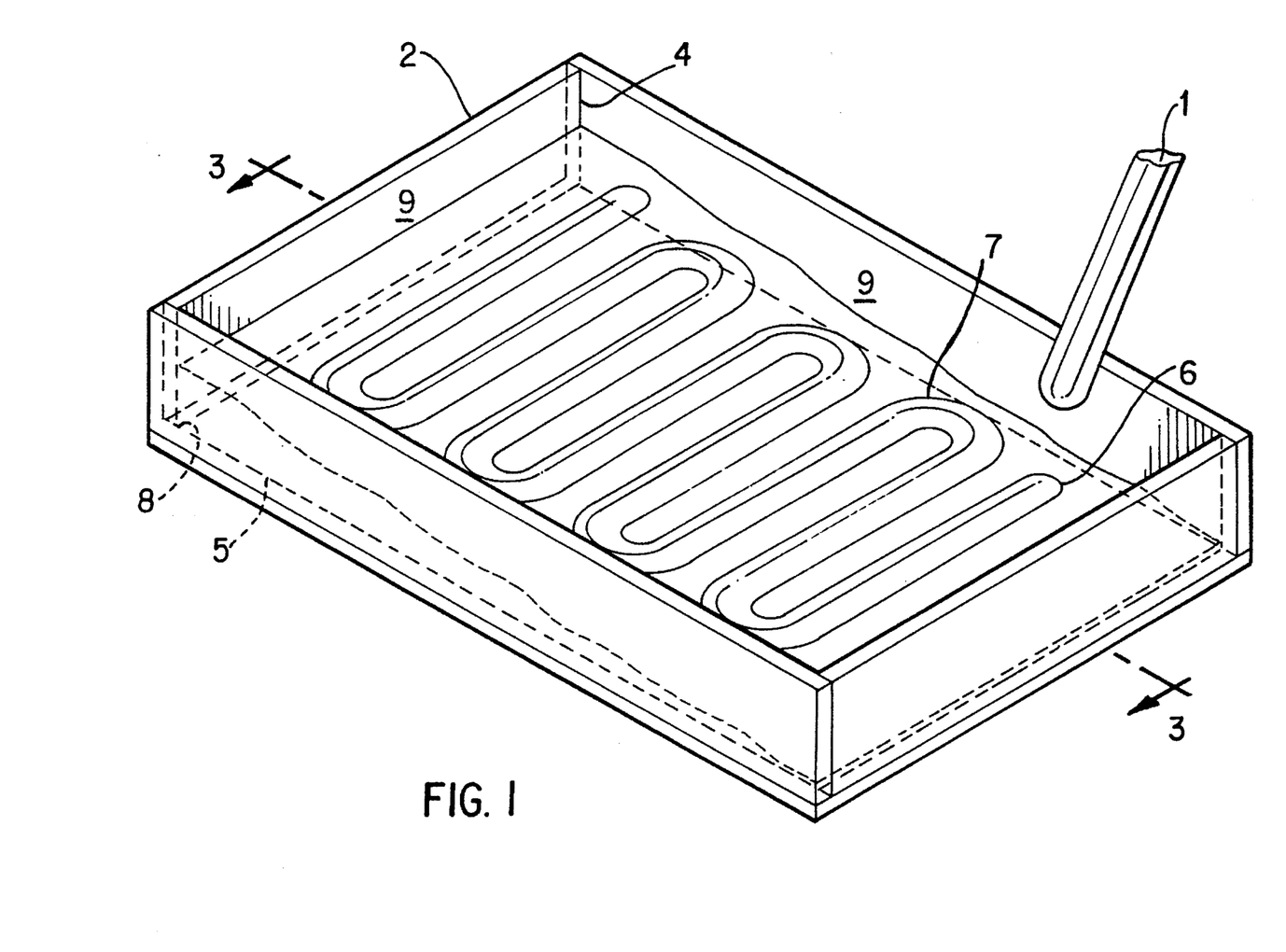
FIG. 1 is a perspective view of an open air block mold having a silicone foam mixture being poured therein, with the silicone foam starting to "blow."

Referring to FIG. 1, there is illustrated the applying of formulated silicone foam mixture 1 into an open air block mold 2. The open air block mold 2 is made of a sturdy material, such as metal or metal alloy, and can be lined with a material, such as a high density polyethylene (HDPE) (Ye=31 mN/m), a resin imparted with metal particles, or a metal amply coated with a polyolefinic mold release agent. All of the joints 4 in the open air block mold 2 must be extremely strong to withstand the force of the silicone foam mixture 1 as it blows into shape. The open air block mold 2 may be made in whatever size is needed for the shape to be produced, and can be attached to a moving conveyor belt (not shown). Further, the open air block mold 2 can be made into part of a conveyor belt, such that the open air block mold 2 has a length of unlimited dimension (not shown). The open air block mold 2 is not enclosed and does not have a lid, which allows the off-gases to be released evenly across the open surface of the open air block mold 2 as the silicone foam mixture 1 cools and sets.

The silicone foam mixture 1 is formulated in accordance with instructions set forth in the General Electric Silicone Product Data Sheet RTF762 for Silicone Rubber Foam. The silicone foam mixture 1 consists of four components: silicone resin; a silicone crosslinker and blowing agent; a diluent; and an additional blowing agent, such as methanol or ethanol. The most efficient levels of the crosslinker to resin is within a range of 5 to 15 part per hundred parts resin (phr). Adding a diluent at 10 phr helps the mixture at higher levels of crosslinker to produce a silicone foam with smaller pores and have a low density. By adding an additional blowing agent at levels of 1 to 10 phr, the resulting silicone foam has an even lower density and stiffness.

The crosslinker, diluent and blowing agent can be premixed (not shown). The premixed combination is then combined with the resin, agitated with a static on a rotating mixer (not shown), and immediately delivered as the formulated silicone foam mixture 1 to the open air block mold 2. The applicant herein appreciates the assistance of Ronald G. Kander, Joel R. Lee and other individuals from the Department of Materials Science & Engineering at the Virginia Polytechnic Institute & State University with the preparation of the formulated silicone foam mixture 1.

Figure 2:
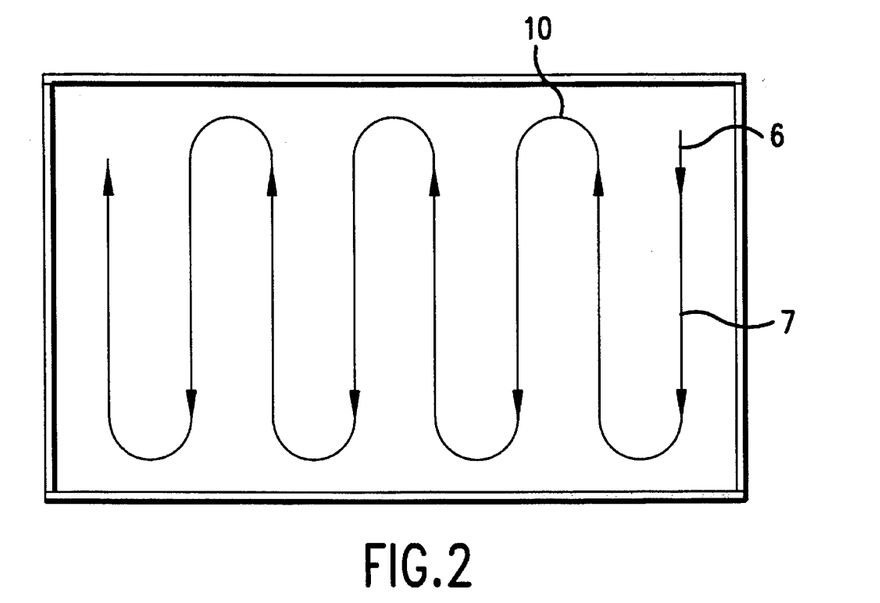
FIG. 2 is a top plan view of an open air block mold, showing the point-of-contact of the silicone foam mixture and the serpentine pour technique that is used to pour the silicone formula.
Figure 3:
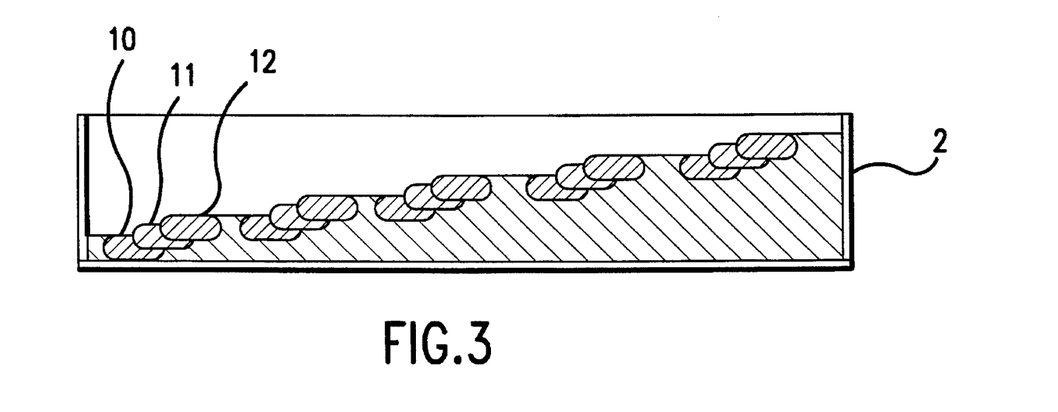
FIG. 3 is a side plan view of the open air block mold taken along lines 3—3 of FIG. 1, showing how the poured silicone foam is to be layered.

As seen in FIG. 1, to make a silicone foam block 5 of a predetermined size, the silicone foam mixture 1, can be applied by using various techniques, such as pouring, spraying, or squirting. As shown in FIGS. 1–3, the application of the silicone foam mixture 1 should start at a precise point-of-contact 6 and continue by using a serpentine application method 7. The precise point-of-contact 6 and the serpentine application method 7 are important because the silicone foam mixture 1, if applied into the open air block mold 2 at only one spot (e.g., the center, but any one point would have the same result), will not result in a silicone foam block 5 having a uniform cell structure. This is because the silicone foam mixture 1, as applied into the open air block mold 2 will immediately start to blow, cure, and drag along the bottom 8 of the open air block mold 2 forming uneven elongated air pockets of different shapes and sizes (not shown) in the resulting silicone foam block 5 along the bottom 8 and along the side walls 9 of the open air block mold 2. The uneven elongated air pockets cause the silicone foam block 5 to have a non-uniform cell structure (not shown).

The uneven elongated air pockets occur because the silicone foam mixture 1 cures at different rates once applied into the open air block mold 2, around the application point-of-contact 6, causing the silicone foam block 5 to have a widely varying cell structure and density. In the preferred embodiment, the silicone foam mixture 1 is applied into the open air block mold 2 at a point which has been chosen as a precise point-of-contact 6, and is applied continuously from that point in a serpentine application method 7 covering as much of the open air block mold 2 as rapidly as possible making sure that the depth of the amount being applied is constant. By using the preferred serpentine application method 7, a finished block 13 having an outer layer 14, shown in FIG. 5, with uniform cell size and density is achieved. The serpentine application method 7 eliminates the dragging of the silicone foam mixture 1 as it blows and cures along the bottom 8 of the open air block mold 2, because, as shown in FIG. 2, the silicone foam mixture 1 is not pushing out from only one point, but rather is blending together along the serpentine application layer 10 along the entire length of the open air block mold 2.

As shown in FIG. 3, to achieve additional height the silicone foam mixture 1 may be layered by applying layers 10–12 using the serpentine application method 7. If additional height is desired, the layers 10–12 must be applied within ninety seconds of the first application of the point-of-contact 6. However, the layers 10–12 should not be applied too quickly, because if too little time elapses between application of the layers 10–12, the silicone foam mixture 1 does not have time to start its blowing process and the finished block 13 will not have a uniform cell structure. Also, if the layers 10–12 are poured after ninety seconds has elapsed since the first application at the point-of-contact 6, the silicone foam mixture 1 will have started to set and will have begun to form an outer layer 14, causing the finished block 13 to have a visual appearance and effect of uneven layering (not shown). The uneven layering is not desirable because it impedes the compressibility of the foam.

Figure 4:
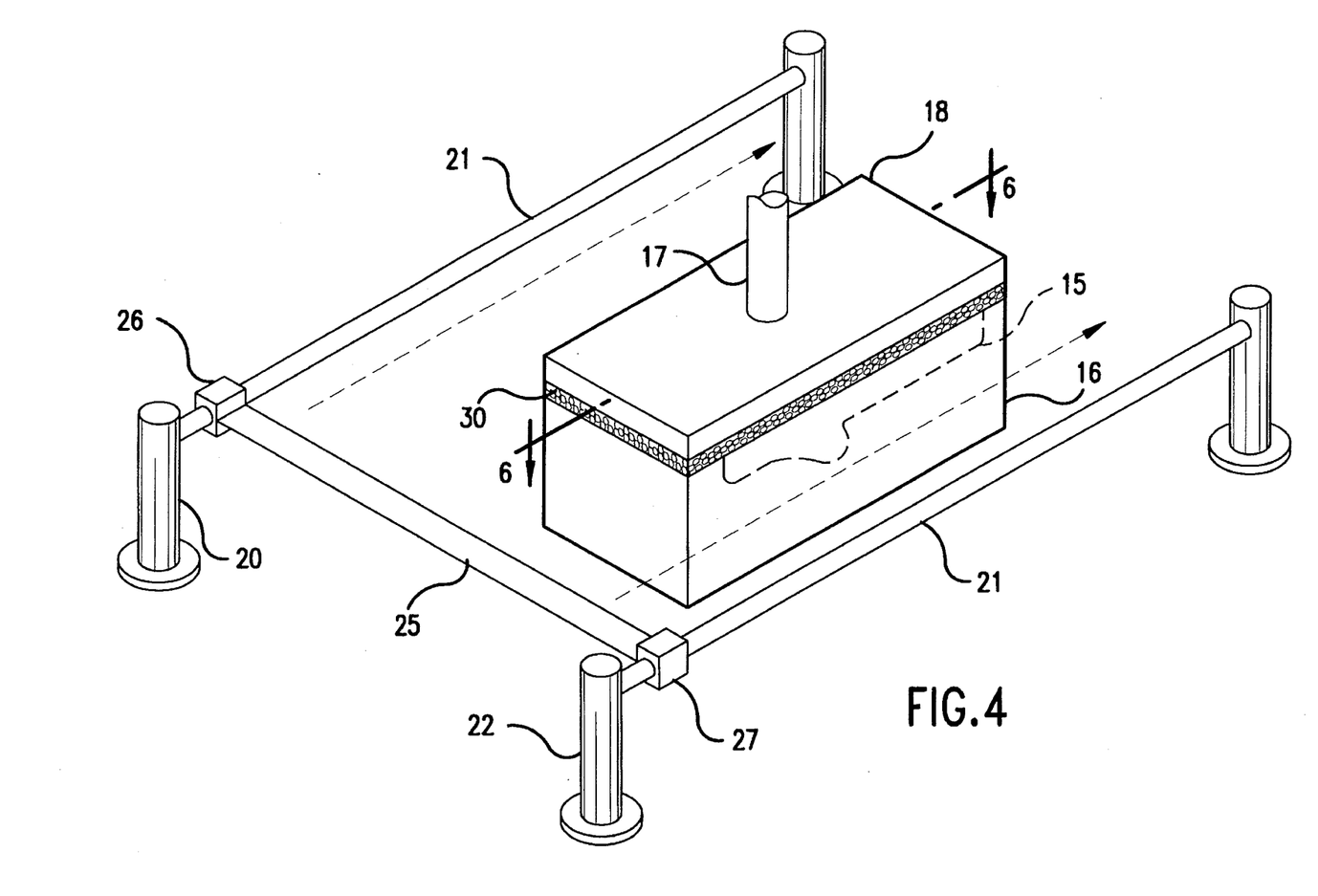
FIG. 4 is a perspective view of the pressed silicone foam block being pressed into a dry inverted mold by a pressure plate, with a blade about to cut the silicone foam block between the presser plate and the mold.
Figure 5:
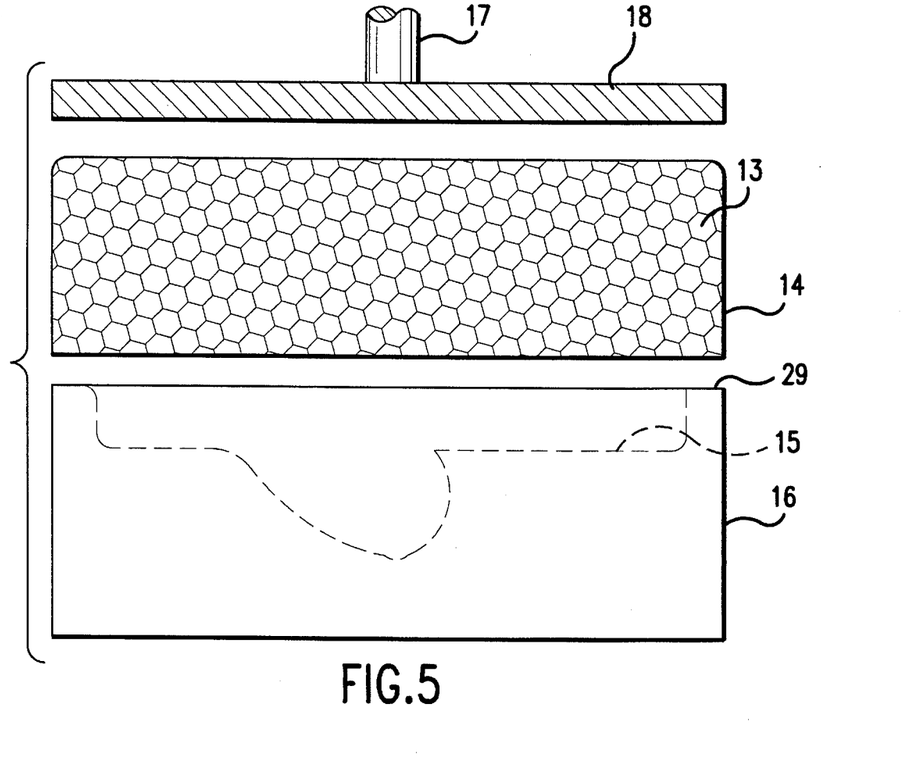
FIG. 5 is an elevational side view of the pressure plate, the silicone foam block and the dry inverted mold.
Figure 6:
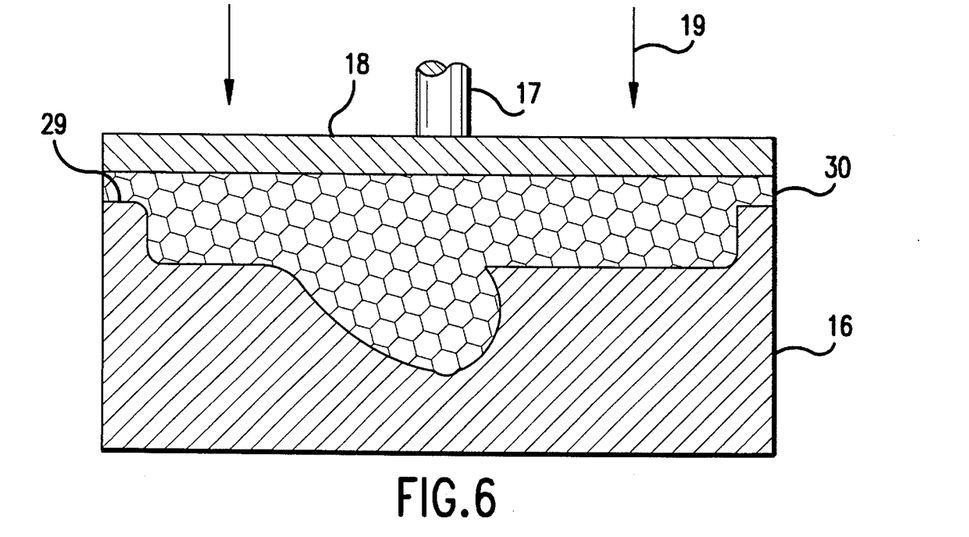
FIG. 6 is an elevational side view taken along lines 6—6 of FIG. 4, showing the silicone foam block being pressed into the dry inverted mold.

Referring to FIGS. 4–6, after the silicone foam mixture 1 has fully blown and cured, which takes approximately 24 hours, the finished block 13 is then easily removed from the open air block mold 2. The finished block 13 may then be used as is or it may be cut into a size or shape as needed. To cut the foam a very sharp blade may be used. Due to the fire and heat resistance of the silicone foam mixture 1 and the finished block 13, the cutting device should not be heated. In the preferred embodiment, a thin beveled serrated blade 25 at room temperature that is well sharpened will cut through the finished block 13. Also a waterjet cutting device (not shown) would work.

To make a molded piece having a desired shape or form, the finished block 13 is placed between a pressure plate 18, and a "dry" inverted mold 16, The dry inverted mold 16 is so-called because it does not come in contact with wet foam. The dry inverted mold 16 may be carved of hard wood, or made of metal. The dry inverted mold 16 is not a detailed mold, rather it will give only the basic shape 15 of a predetermined article or component of an article. The basic shape 15 can have any desired configuration, such as the human body, or any part of the human body, a seat, a shock absorber, a munitions case, or packing material. For some applications, such as a cushioned seat, which normally will have fabric covers, the basic shape 15 provided by the dry inverted mold 16 may be all that is needed. In such applications, the use of additional molds to provide detailed features is not needed.

The pressure plate 18 can be a plate of metal or metal alloy that is attached to a rod 17. The rod 17 must be able to apply constant pressure to the pressure plate 18. As shown in FIGS. 4 and 6, the pressure plate 18 will apply a uniform, constant pressure 19 to the finished block 13. The amount of pressure 19 to be applied to the pressure plate 18 will depend on the size and density of the finished block 13 and the desired basic shape 15. The pressure 19 must be carefully gauged. If there is too little pressure 19, the finished block 13 will have foam that will slide inside the dry inverted mold 16 such that the resulting shape will not be true. If there is too much pressure 19 applied to the finished block 13, too much foam will be pressed into the dry inverted mold 16, and once again the resulting shape will be untrue. For example, 1000 pounds of pressure 19 is needed to press a finished block 13 having a density of 9 pounds per cubit foot into the dry inverted mold 16 of a female torso, which measures approximately 10 inches by 20 inches. Each application will need to have the correct amount of pressure 19 applied, depending on the above-mentioned factors.

As shown in FIGS. 4 and 6, the pressure 19 must be uniformly and continuously maintained while the finished block 13 is being cut to deliver the desired basic shape 15. To make the desired basic shape 15 out of the finished block 13, the pressure 19 is applied straight down, and the cutting device 20 having a blade 25 cuts through the top excess foam layer 30, which is formed between the pressure plate 18 and the dry inverted mold 16.

Figure 7:
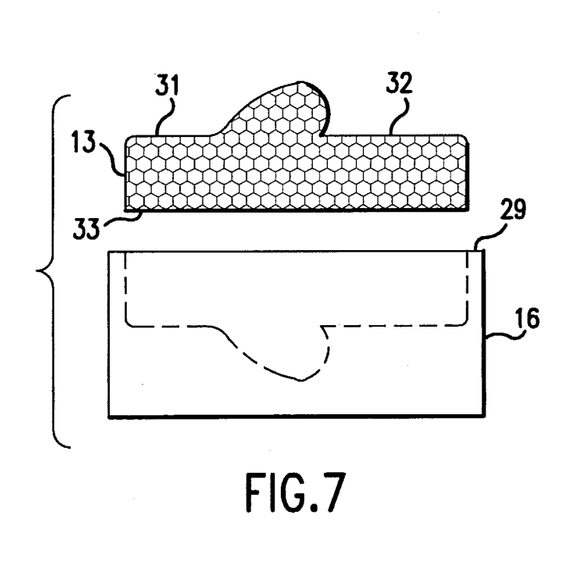
FIG. 7 is an elevational side view of the silicone foam piece after being removed from the dry inverted mold and after the blade has cut between the pressure plate and the mold, with the silicone foam piece having the inverted symmetrical shape of the dry inverted mold.

As shown in FIG. 7, after the blade 25 has cut through the top excess foam layer 30, the pressure 19 is removed which releases the cut finished block 13 from the dry inverted mold 16. The released cut finished block 13 produces an inverted molded shape 31. This process of forming the basic shape 15 from a dry inverted mold 16 is called the forced symmetrical inversion molding process. This process is so called because, as shown in FIGS. 6 and 7, when the pressure 19 is released after cutting through the top excess foam layer 30, the cut surface 32 of the resulting inverted molded shape 31 forms and acquires the inverted symmetrical configuration of the desired basic shape 15 of the dry inverted mold 16. The uncut side 33 that was actually pressed against the surface of the dry inverted mold 16 does not acquire any shape. Indeed, the uncut side 33 returns to its original flat shape.

More specifically, as shown in FIGS. 4–7, the finished block 13 is pressed into the dry inverted mold 16. The pressure 19 causes the top excess foam layer 30 to form over the top surface 29 of the dry inverted mold 16. The blade 25 of the cutting device 20 is moved along a longitudinal axis across the top excess foam layer 30 that is between the pressure plate 18 and the top surface 29 of the dry inverted mold 16. The blade 25 cuts parallel to and just above the top surface 29. If the blade 25 cuts too high or not close to the top surface 29, the resulting inverted molded shape 31 will have an unintended and undesired foam lip (not shown).

As shown in FIG. 4, the cutting device 20 has poles 22 that support alignment rods 21. The blade 25 is removably attached to two sliding blade supports 26 and 27 that slide along the alignment rods 21. The blade supports 26 and 27 are pneumatically controlled (not shown) to movably slide along the alignment rods 21. Alternatively, the dry inverted mold 16 with the finished block 13 pressed thereto may be run through a stationary cutting device by moving the dry inverted mold 16 and the pressed top excess foam layer 30 across a cutting blade (not shown).

Figure 8:
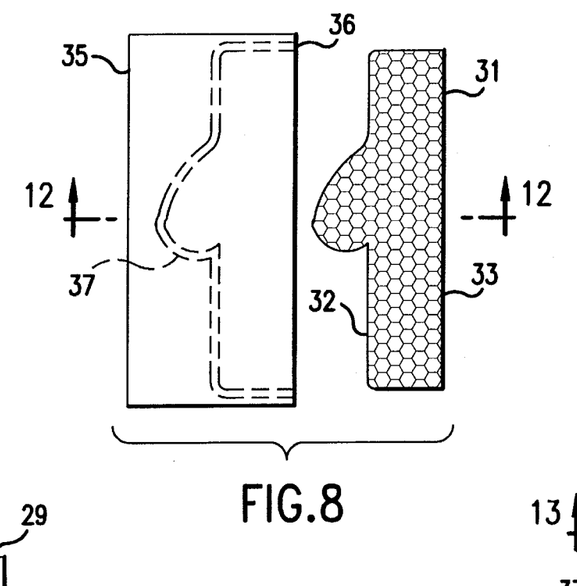
FIG. 8 is an elevational side view of the released silicone foam piece and a detail and skinning mold, which has been sprayed with a silicone foam mixture to form a skin of a predetermined thickness.
Figure 12:
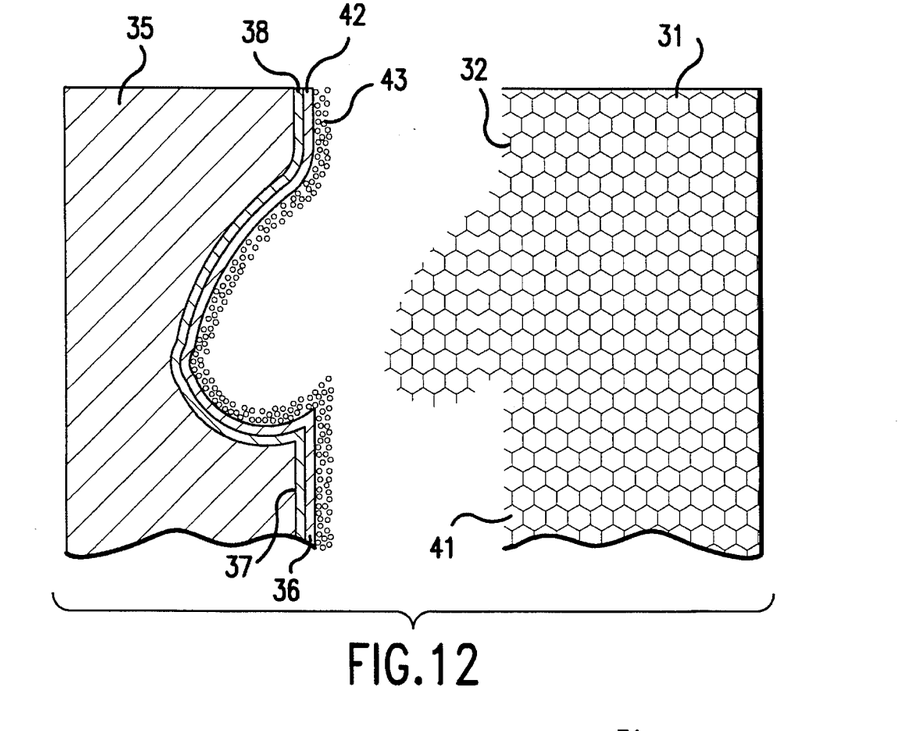
FIG. 12 is an elevational side view taken along lines 12—12 of FIG. 8, showing a detail view of a silicone skin layer forming against the inside surface of the detail and skinning mold and the released silicone foam piece.

As shown in FIG. 7, after the finished block 13 has been cut, the pressure plate 18 is lifted and the inverted molded shape 31 is released from the dry inverted mold 16. The inverted molded shape 31 will be flat on the bottom, which is the uncut side 33 that was pressed into the dry inverted mold 16, and the cut surface 32 will have the inverted symmetrical configuration of the basic shape 15 of the dry inverted mold 16. As shown in FIGS. 7, 8 and 12, the cut surface 32 will have cells that have been cut open forming numerous hollows 41. The inverted molded shape 31 can now be used "as is" or it can be pressed into a detail and skinning mold 35.

Referring to FIG. 8, the detail and skinning mold 35 is an open air mold that has the ability to have the same detailed characteristics as a model that has been sculpted with the desired precise shape and features. The detail and skinning mold 35 is made with a material that can be formed to have the desired shape of an article, such as a female torso. In the preferred embodiment, the material to form the detail and skinning mold 35 is resin imbedded with metal particles and overlaid with a fiberglass soaked webbing. A detail and skinning mold 35 can be made of other materials. The detail and skinning mold 35 should be constructed, however, of sturdy material that is capable of withstanding the pressure from applying the inverted molded shape 31 into the detail and skinning mold 35. Also, the detail and skinning mold 35 should be able to comply with the use of release compounds. This is because, as shown in FIG. 12, the inner surface 37 of the detail and skinning mold 35 is coated with a silicone releasing agent 38, such as Hexcel 8302 or polythaline spray Poly Lease 77, type 664. A skinning silicone foam 36, which is formulated similar to the silicone foam mixture 1, is then applied over the silicone releasing agent 38. The skinning silicone foam 36 has a tear resistant feature.

Figure 9:
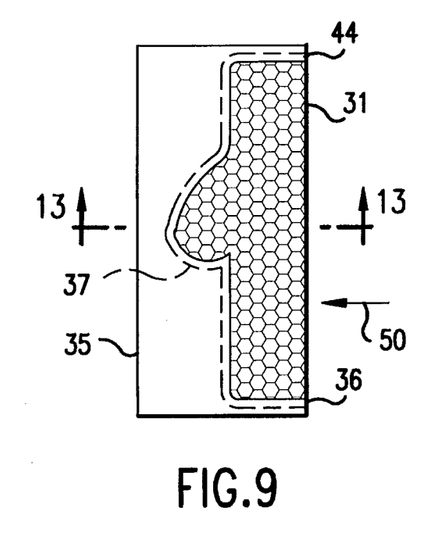
FIG. 9 is an elevational side view of the molded silicone foam piece inserted and pressed into the detail and skinning mold, which has been sprayed with the silicone foam mixture to form a skin layer.
Figure 13:
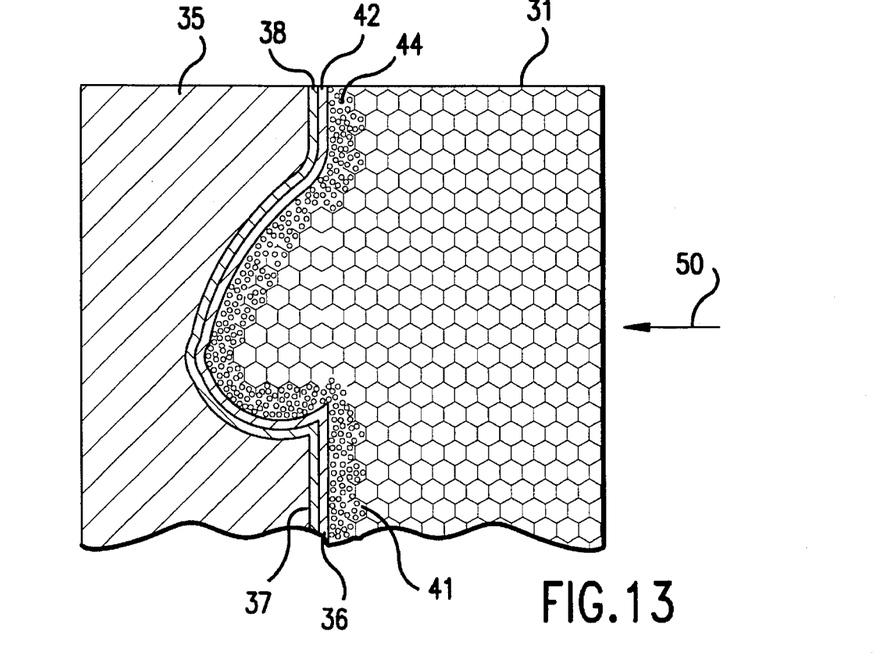
FIG. 13 is an elevational side view taken along lines 13—13 of FIG. 9, showing a detail view of the released silicone foam piece being bonded into the silicone skin layer to form a skinned molded piece of silicone foam.

As shown in FIGS. 9, 12 and 13, the inverted molded shape 31 is pressed into the detail and skinning mold 35 and against the skinning silicone foam 36. The inverted molded shape 31 must be pressed into the detail and skinning mold 35 after three to seven minutes have elapsed since the application of the skinning silicone foam 36. The three minutes allows the skinning silicone foam 36 to start to cure, which allows an outer skin layer 42 to be formed against the silicone releasing agent 38. Also during the cure process, an inner skin layer 43 is forming away from the inner surface 37 of the detail and skinning mold 35.

As shown in FIGS. 12 and 13, the inverted molded shape 31 must be pressed into the detail and skinning mold 35, before seven minutes have passed since the application of the skinning silicone foam 36, to ensure a proper bonding between the skinning silicone foam 36 and the cut surface 32 of the inverted molded shape 31. The three to seven minutes time frame will allow the skinning silicone foam 36 to blow into the cut surface 32 of the inverted molded shape 31 forming an interwoven bond 44. The hollows 41 that are created by the cells which have been cut open in the cut surface 32 of the inverted molded shape 31 become filled with the foam of the inner skin layer 43 to form the interwoven bond 44. If the inverted molded shape 31 is pressed into the detail and skinning mold 35 after seven minutes have elapsed since the skinning silicone foam 36 is applied, the interwoven bond 44 does not hold well under tension. Also, an interwoven bond 44 formed after seven minutes is not viscous enough to interweave and fill the hollows 41 of the cut surface 32 of the inverted molded shape 31.

If the inverted molded shape 31 is pressed into the detail and skinning mold 35, before three minutes have elapsed since the application of the skinning silicone foam 36, the skinning silicone foam 36 does not have enough time to cure and form the outer and inner skin layers 42 and 43, respectively. The inverted molded shape 31 when pressed into the detail and skinning mold 35 would then form a pocked and unattractive finish (not shown).

Figure 10:
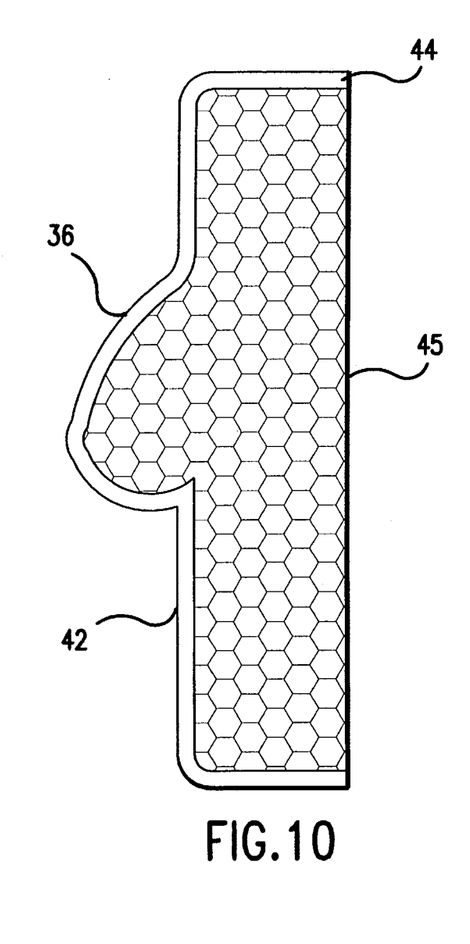
FIG. 10 is an elevational side view of a molded silicone foam piece with a skin layer attached thereto to form a skinned molded piece.
Figure 11:
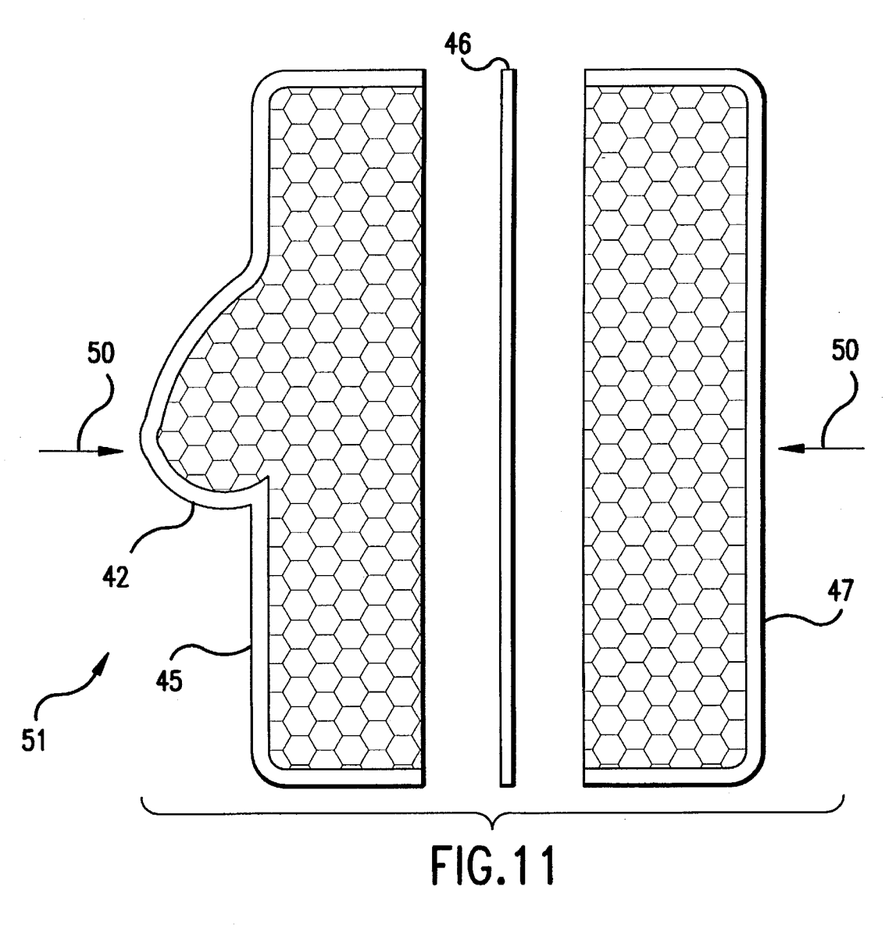
FIG. 11 is an elevational side view of two skinned molded pieces about to be bonded.

When the inverted molded shape 31 is pressed into the detail and skinning mold 35 within the three to seven minute timeframe, the inverted molded shape 31 should be pressed with a constant and uniform pressure 50. The inverted molded shape 31 should be pressed into the detail and skinning mold 35 for approximately twenty minutes to allow an interwoven bond 44 to form. Due to the silicone releasing agent 38, the inverted molded shape 31 after twenty minutes can be easily removed from the detail and skinning mold 35, and, as shown in FIG. 10, becomes a skinned molded piece 45. As shown in FIG. 11, if it is desired to have an article 51 that consists of several skinned molded pieces, such as 45 and 47, the skinned molded pieces 45 and 47 can be pressed together, with a silicone foam bonding layer 46 in between the skinned molded pieces 45 and 47, to form the article 51. The detail and skinning mold 35 can also be designed such that it can consist of two or more detail and skinning mold 35 that can be attached and pressed together to form a complex desired configuration, such as the article 51 (not shown). After twenty minutes have elapsed, the detail and skinning mold 35 can be removed, having an article 51 ready for use.

Upon removal of the skinned molded piece 45 from the detail and skinning mold 35, the outer skin layer 42 will have the finishing detailing that was etched into the inner surface 37 of the detail and skinning mold 35. In the case of the female torso, the outer skin layer 42 would have a human skin texture, which has a matted patina surface and not a shiny reflective surface (not shown).

The outer skin layer 42 can also show structural details like the sternum, and the clavicle. If a skinned molded piece of a human hand was needed, the knuckle and fingernails could be realistically shown with all of the fold lines, wrinkles and surface changes. The skinned molded piece 45 can now be used as is, if that is the needed application, or it may be bonded to another skinned molded piece 47 to form the article 51. The skinned molded pieces 45 and 47 can have skeleton sections set in between them to meet the needs of the application.

It is to be understood that while certain forms of this invention have been illustrated and described, the invention is not limited thereto, except insofar as such limitations are included in the following claims.

What is claimed and described to be secured by Letters Patent is as follows:

1. A method for manufacture of an article of molded silicone foam having the features of a designated object, said method comprising the steps of:

(a) introducing a silicone foam mixture into a first mold having a first cavity, said silicone foam mixture forming a first molded object having a top surface and a first bottom surface that form a shape that is representative of said first cavity;

(b) removing said first molded object from said first mold;

(c) pressing said first molded object into a second mold having a top edge and a second cavity, said second cavity adjacent to said top edge and having a profile that is representative of said article, said first bottom surface of said first molded object being pressed against said second cavity, said top surface of said first molded object forming a layer of foam on said top edge;

(d) cutting said layer to form an opened celled surface on said top surface of said first molded object; and (e) releasing and removing said first molded object from said second cavity, said opened celled surface having a configuration that is representative of said second cavity, said first bottom surface returning to said shape of said first cavity.

2. The method of claim 1 and including the step of using a serpentine application technique in introducing said silicone foam mixture into said first mold.

3. The method of claim 2 and including the steps of lining a third mold having a third cavity that has specific attributes of said article, introducing a release agent into said third cavity, introducing said silicone foam mixture on said release agent, pressing said first molded object into said third mold with said release agent and said silicone foam, and removing said first molded object from said third mold after said silicone foam mixture has bonded to said first molded object to form a skinned layer, said skinned layer having said specific attributes.

4. The method of claim 2 and including the steps of lining a third mold having a third cavity that has specific attributes of said article, introducing a release agent into said third cavity, introducing said silicone foam mixture on said release agent, pressing said opened celled surface of said first molded object into said third mold with said release agent and said silicone foam mixture, and removing said first molded object from said third mold after said silicone foam mixture has bonded to said opened celled surface to form a skinned layer, said skinned layer having said specific attributes.

5. The method of claim 3 and including the step of allowing said silicone foam mixture to cure in said third cavity for a time range from about three to seven minutes prior to pressing said first molded object into said third mold.

6. The method of claim 2 and including the steps of making a second molded object having a second bottom surface, applying said silicone foam mixture to said first and second bottom surfaces, and pressing said first and second bottom surfaces together to form a first complex shape having a third bottom surface.

7. The method of claim 6 and including the steps of making a second complex shape having a fourth bottom surface, and applying said silicone foam mixture to said third and fourth bottom surfaces to form a first complex article.

8. The method of claim 4 and including the step of allowing said silicone foam mixture to cure in said third cavity for a time range from about three to seven minutes prior to pressing said opened celled surface into said third mold.

9. The method of claim 4 and including the steps of making a second molded object having a second bottom surface, applying said silicone foam mixture to said first and second bottom surfaces, pressing said first and second bottom surfaces together to form a first complex shape having a third bottom surface, making a second complex shape having a fourth bottom surface, and applying said silicone foam mixture to said third and fourth bottom surfaces to form a first complex article.

10. A method for manufacture of an article of molded silicone foam having the features of a designated object, said method comprising the steps of:

(a) introducing a silicone foam mixture in a serpentine manner into a first mold having a first cavity, said silicone foam mixture forming a first molded object having a top surface and a first bottom surface that form a shape that is representative of said first cavity;

(b) removing said first molded object from said first mold;

(c) pressing said first molded object into a second mold having a top edge and a second cavity, said second cavity adjacent to said top edge and having a profile that is representative of said article, said first bottom surface of said first molded object being pressed against said second cavity, said top surface of said first molded object forming a layer of foam on said top edge;

(d) cutting said layer to form an opened celled surface on said top surface of said first molded object;

(e) releasing and removing said first molded object from said second cavity, said opened celled surface having a configuration that is representative of said second cavity, said first bottom surface returning to said shape of said first cavity;

(f) lining a third mold having a third cavity having specific attributes of said article with a release agent;

(g) introducing said silicone foam mixture on said release agent; and (h) pressing said first molded object into said third mold with said release agent and said silicone foam mixture, and removing said first molded object from said third mold after said silicone foam mixture has bonded to said first molded object to form a skinned layer, said skinned layer having said specific attributes.

11. The method of claim 10 wherein said opened celled surface of said first molded object is pressed into said third cavity.

12. The method of claim 10 and including the step of allowing said first molded object to bond to said silicone foam mixture in said third cavity for a time range of 15 to 25 minutes to form said skinned layer.

13. The method of claim 11 and including the step of allowing said opened celled surface to bond to said silicone foam mixture in said third cavity for a time range of 15 to 25 minutes to form said skinned layer.

14. The method of claim 10 and including the step of allowing said silicone foam mixture to cure in said third cavity for a time range from about three to seven minutes prior to pressing said first molded object into said third mold.

15. The method of claim 11 and including the step of allowing said silicone foam mixture to cure in said third cavity for a time range from about three to seven minutes prior to pressing said opened celled surface into said third mold.

16. The method of claim 10 and including the steps of making a second molded object having a second bottom surface, applying said silicone foam mixture to said first and second bottom surfaces, pressing said first and second bottom surfaces together to form a first complex shape having a third bottom surface, making a second complex shape having a fourth bottom surface, and applying said silicone foam mixture to said third and fourth bottom surfaces to form a complex article.

17. A method for manufacture of an article of molded silicone foam having the features of a designated object, said method comprising the steps of:

(a) introducing a silicone foam mixture in a serpentine manner into a first mold having a first cavity, said silicone foam mixture forming a first molded object having a top surface and a first bottom surface that form a shape that is representative of said first cavity;

(b) removing said first molded object from said first mold;

(c) pressing said first molded object into a second mold having a top edge and a second cavity, said second cavity adjacent to said top edge and having a profile that is representative of said article, said first bottom surface of said first molded object being pressed against said second cavity, said top surface of said first molded object forming a layer of foam on said top edge;

(d) cutting said layer to form an opened celled surface on said top surface of said first molded object;

(e) releasing and removing said first molded object from said second cavity, said opened celled surface having a configuration that is representative of said second cavity, said first bottom surface returning to said shape of said first cavity;

(f) lining a third mold having a third cavity having specific attributes of said article with a release agent;

(g) introducing said silicone foam mixture on said release agent and allowing said silicone foam mixture to cure in said third cavity for a time range from about three to seven minutes; and (h) pressing said opened celled surface of said first molded object into said third mold with said release agent and said silicone foam mixture, said silicone foam mixture bonding to said open celled surface to form a skinned layer, and removing said first molded object from said third mold, said skinned layer having said specific attributes.

18. The method of claim 17 and including the step of allowing said opened celled surface to bond to said silicone foam mixture in said third cavity for a time range of 15 to 25 minutes to form said skinned layer.

19. The method of claim 18 and including the steps of making a second molded object having a second bottom surface, applying said silicone foam mixture to said first and second bottom surfaces, pressing said first and second bottom surfaces together to form a first complex shape having a third bottom surface, making a second complex shape having a fourth bottom surface, and applying said silicone foam mixture to said third and fourth bottom surfaces to form a complex article.

* * * * *